*INVENTOR:—*
ROLF G. EDHOLM
BY:—
ATTORNEY 3,004,163
RADIATION GAUGING SYSTEM
Rolf G. Edholm, Milwaukee, Wis., assignor to General Electric Company, a corporation of New York
Filed Dec. 17, 1957, Ser. No. 703,302
4 Claims. (Cl. 250—83.3)

The present invention relates in general to the detection and measurement of penetrating rays, such as X-rays, and has more particular reference to a radiation gauging system designed to measure the absodption of penetrating rays in material undergoing irradiation, while excluding the measurement error producing affects of ray absorption by one or several contaminating elements, present in the material being examined and having ray absorbing characteristics different from those of the examination material.

An important object of the present invention is to provide for gauging the density or thickness of material by applying, through the material, penetrating radiation embodying a plurality of distinguishable energy wave lengths, including a wave length absorbable by the material under examination and a different wave length heavily absorbable by a contaminant substance contained in the material, filtering a portion of the beam and detecting the same to obtain a correctional signal corresponding with the beam component of wave length heavily absorbed by the contaminant substance, detecting the beam to produce a density gauging signal, modulating said signal in accordance with the correctional signal and applying the modulated signal as a density or thickness indication.

Another important object of the present invention is to provide a gauging system embodying means for differentially detecting unlike energy zones of radiant energy that has been passed through material to be examined, to thereby utilize, for gauging purposes, a radiant energy component which corresponds with the density of the material undergoing radiation, while modifying the measurement in accordance with a detected energy component corresponding with the absorption characteristics of a contaminating substance present in the material.

Another important object of the invention is to provide means for examining radiant energy applied through examination material containing contaminating substances, in order to discriminate between radiation components that have been modified respectively by the material under examination and by the contaminating substances, to thus detect the density or thickness of the examination material, as well as the amount of contaminating substance or substances present in the material under examination.

Briefly stated, the present invention is based upon the circumstance that every material has a separate and distinct absorption characteristic when exposed to radiant energy of selected wave length, such circumstance being utilized by providing a radiation source capable of producing a penetrating ray beam having several different energy components, of unlike wave length, and by differentially detecting and evaluating selected energy component zones of the beam, while excluding its remaining zones, after the radiation has been passed through the examination material, such discrimination being accomplished by filtering the irradiation, either mechanically as by means of a filter, or electronically as by pulse discrimination, in order to select pulsations of desired voltage for detection, and by then measuring the selected and detected energy component thereby to obtain a density or thickness measurement of the material under examination, other energy components of the irradiation, corresponding with contaminating substances, present in the examination material, being also filtered and separately detected to provide a signal for correcting the density or thickness measurements, and, if desired, to determine the quantity of contaminants present in the examination material.

More specifically, the present invention suggests the utilization, for density or thickness gauging purposes, if an X-ray tube having an anode embodying target elements producing penetrating X-rays of unlike characteristic wave lengths that are absorbed heavily by the impurities in the examination material, as well as a penetrating ray component that is absorbed heavily by material under examination. Such multiple wave length irradiation, after being passed through examination material containing contaminants, may be filtered by known mechanical or electronic means respectively sensitive only to selected components of desired wave length, and detected to produce corresponding signals, which may then be applied to suitable integrating or differentiating circuits to thereby apply the signals either to provide a corrected density or thickness measurement of the examination material, or as a separate quantitative measurement of the contaminating material or materials.

The foregoing and numerous other important objects, advantages and inherent functions of the invention will become apparent as the same is more fully understood from the following description, which, taken in connection with the accompanying drawing, discloses a preferred embodiment of the invention.

Referring to the drawing.

Figure 1:
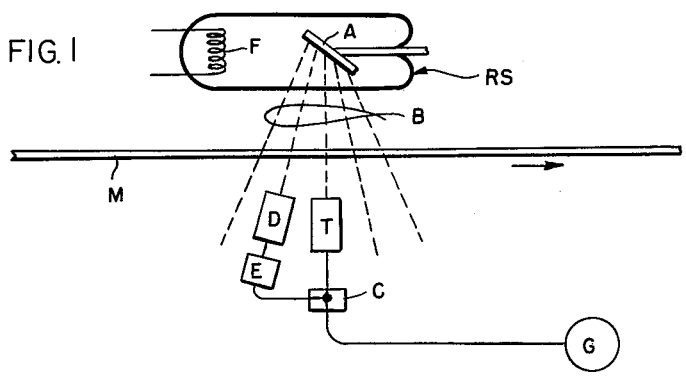
FIG. 1 is a diagrammatic showing of a sheet metal thickness gauging system embodying the present invention.

To illustrate the invention the drawing shows gauging systems each embodying a radiation source RS capable of producing a beam of radiation B containing several radiant energy zones of unlike wave length. The source RS, as shown, may comprise an X-ray generating tube having an electron emitting cathode F and an anode A embodying a plurality of targets S, X and L, each adapted to produce a corresponding radiant energy component of characteristic wave length. It should be understood, however, that an energy source capable of producing so-called wide band or "white" radiation, or any suitable radiant energy source capable of producing a plurality of radiation components of unlike wave length, may be employed, and, in that connection, the present invention visualizes the possibility of employing an irradiation source comprising a plurality of unlike radiation emitting isotopes.

As shown more particularly in FIG. 1, the radiation beam B may be applied through a strip of sheet metal M to measure the density of its constituent material or for thickness gauging purposes. The strip of metal M, for example, may comprise a continuous sheet of aluminum as delivered continuously from a rolling mill and containing a contaminant such as copper; or the sheet may comprise steel containing magnesium or chromium or some other metal as a contaminating substance. Immediately beneath the sheet M and in the path of the beam B after the same has penetrated the sheet are disposed a pair of detecting elements D and T. The detector T may comprise an ion chamber suitably connected through conventional circuitry with an indicator or recorder G calibrated to show the thickness of the sheet M. The detector T may be sensitive, in some degree at least, to all of the energy components contained in the beam B. Preferably, however, it should be made especially sensitive to a particular energy component, such as the component X. This may be accomplished by conventional mechanical filtration or electronic discrimination means. In either case, the response of the detector T will be affected, to some extent at least, by the presence of the contaminating substance in the examination strip M, as well as by the density or thickness of the primary material of the sheet M, thereby causing erroneous operation of the gauge G.

The detector D, however, which may also comprise an ion chamber, is made particularly sensitive to an energy component of the beam B, such as the component S, that is heavily absorbed by the contaminating substance. This may be accomplished by mechanically filtering the radiation to exclude from the detector D all components of the beam except the component of desired wave length. Alternately, the detector D may be connected with electronic discriminating means E adapted to reject all responses of the equipment to irradiation components other than the desired one.

The response of the detector D, in accordance with the present invention, is applied through a suitable correction network C disposed in the circuit between the detector T and the gauge G. The response of the detector D, which is a function of the amount of contaminant material in the metal strip M, is thus applied in the density gauging circuitry as a correctional factor to cause the gauge G to indicate the true density or thickness of the sheet M by eliminating the inaccuracy that otherwise would be imparted in the thickness gauging circuit through the detector T as the result of absorption of radiant energy by the contaminating substance in the strip M under examination.

Figure 2:
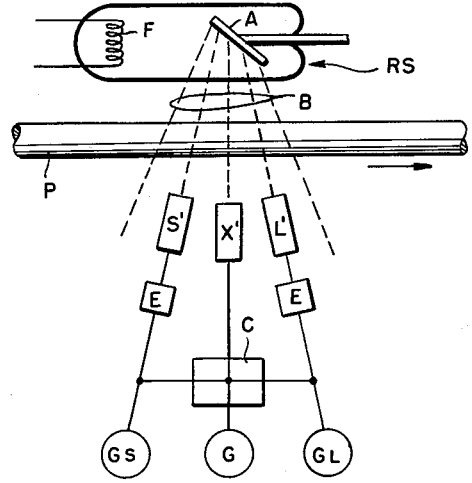
FIG. 2 is a diagrammatic illustration of a density gauging system embodying the present invention.
Figure 3:
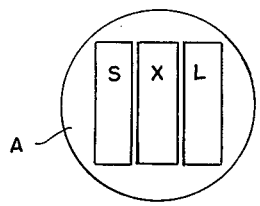
FIG. 3 is a face view of an X-ray tube anode that may be employed in carrying out the teachings of the present invention.

As shown more particularly in FIG. 2, the teachings of the present invention may be incorporated in apparatus for determining the density of material such as liquid gasoline as the same is passed through a delivery conduit or pipe P, through which the multiple component beam B is passed and then applied upon a plurality of detectors S', X' and L', each conditioned to react or respond to corresponding components S, X and L of the beam. For example, where the liquid in the pipe P comprises gasoline containing, say, lead and sulphur as contaminants, the beam B may embody a component X corresponding with and heavily absorbed by the gasoline to be gauged, and components S and L respectively corresponding with and heavily absorbable by the sulphur and lead contaminants. The detectors X', S' and L' may be disposed in the path of the beam B after the same has penetrated through the pipe P containing the contaminated gasoline under examination. The detectors X', S' and L' may be conditioned, as by mechanical filtration of beam components or by electronic discrimination, or in any other suitable or preferred fashion, to respond respectively to the beam components that are absorbed most heavily by the gasoline, the sulphur and the lead contaminants. The response or output of the detector X', which serves to measure the density of the gasoline, is applied through correctional circuitry C and thence to an indicating or recording gauge G. The detectors S' and L' may each be associated with a corresponding electronic discriminator E so that the responses of the detectors S' and L' only to their corresponding beam components, may be applied as correctional factors in the circuitry C, whereby the response of the density detector X may be corrected, to eliminate errors due to the contaminants, and then delivered for the operation of the density gauge G.

Where the examination material is gasoline, for example, it may be highly desirable also to determine the precise amount of each contaminant contained in the examination material. This may readily be accomplished by applying the responses of the detectors S and L respectively for the operation of corresponding quantity indicators or recorders G–S and G–L.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. The method of gauging the density of known material which consists in applying, through the material, a beam of penetrating X-ray radiation comprising a plurality of components of distinguishable energy wave lengths, including a component of wave length for which the absorption characteristic of material under examination is known and a component of different wave length heavily absorbable by a contaminant substance contained in the material, detecting the beam to produce a density gauging signal, isolating the component of different wave length and separately detecting the same to obtain a correctional signal corresponding with the component of wave length heavily absorbed by the contaminant substance, modulating said density gauging signal in accordance with the correctional signal to reduce the error therein caused by said contaminating substance, and applying the corrected signal as a density or thickness index of said first known material.

2. The method of gauging the density of known material which consists in applying, through the material, a beam of penetrating X-ray radiation embodying a plurality of components of distinguishable energy wave lengths, including a component of wave length for which the absorption characteristic of the material under examination is known and a component of different wave length heavily absorbable by a contaminant substance contained in the material, detecting the beam to produce a density gauging signal, filtering the beam to isolate the component of different wave length and separately detecting the same to obtain a correctional signal corresponding with the component of wave length heavily absorbed by the contaminant substance, modulating said density gauging signal in accordance with the correctional signal to reduce the effect thereon of said contaminating substance, and applying the modulated signal as a density or thickness indication.

3. The method of gauging the density or thickness of a material having known absorption characteristics to X-ray radiation of a particular wave length but which material bears a contaminant, which comprises applying through said material X-ray radiation having said particular wave length and having an additional long wave length heavily absorbable by said contaminant, separately detecting said radiations of said two wave lengths after they have penetrated the material to produce separate signals, respectively, one varying with the thickness or density of said material but undesirably affected by said contaminant and the other varying in accord with said contaminant, and applying said second signal to said first signal to counteract the effect thereon produced by said contaminant thereby to produce a resulting signal more accurately representative of said thickness or density, and applying the result as an index of thickness or density of said material.

4. X-ray gauging apparatus for determining the density or thickness of material under test, comprising the combination of X-ray source capable of producing radiations having a band of frequencies including a particular frequency of X-ray radiation for which the absorption characteristic of the material to be gauged is known and an X-ray radiation of long wave length heavily absorbable by a contaminant in said material, said source being arranged to transmit said radiations through said material, a gauging detector responsive to all said radiations but selective to said radiation of particular frequency whereby its output is affected by said contaminating material, a second detector selective to said long wave length, means to combine the output of said two detectors in such a way that the effect produced on the output of the first detector by said contaminating material is neutralized by the output of said second detector thereby to produce a desired response corresponding to the density or thickness of said material irrespective of said contaminant.

References Cited in the file of this patent

UNITED STATES PATENTS

| | | |
|---|---|---|
| 1,310,714 | Rider | July 22, 1919 |
| 2,097,760 | Failla | Nov. 2, 1937 |
| 2,462,995 | Ritzman | Mar. 1, 1949 |
| 2,525,292 | Fua et al. | Oct. 10, 1950 |
| 2,653,247 | Lundahl | Sept. 22, 1953 |
| 2,711,480 | Friedman | June 21, 1955 |
| 2,761,067 | Troy | Aug. 28, 1956 |
| 2,763,790 | Ohmart | Sept. 18, 1956 |
| 2,784,319 | Flook et al. | Mar. 5, 1957 |
| 2,810,835 | Miller | Oct. 22, 1957 |
| 2,849,617 | Karasch | Aug. 26, 1958 |
| 2,914,676 | Dijkstra et al. | Nov. 24, 1959 |
| 2,920,206 | Heller | Jan. 5, 1960 |
| 2,947,871 | Friedman | Aug. 2, 1960 |

FOREIGN PATENTS

| | | |
|---|---|---|
| 249,401 | Switzerland | Apr. 1, 1948 |
| 699,129 | Great Britain | Oct. 28, 1953 |